United States Patent Office 3,758,435
Patented Sept. 11, 1973

3,758,435
RUBBER BONDING CEMENT FOR BONDING EPDM TO GENERAL PURPOSE RUBBER
Charles F. Paddock, Wayne, N.J., assignor to Uniroyal, Inc., New York, N.Y.
No Drawing. Original application May 13, 1970, Ser. No. 37,030, now Patent No. 3,653,423. Divided and this application Jan. 12, 1972, Ser. No. 217,269
Int. Cl. B32b 25/04; C08k 1/22
U.S. Cl. 260—33.6 A          6 Claims

ABSTRACT OF THE DISCLOSURE

A rubber bonding cement which comprises a solution of a compounded graft copolymer in a volatile organic solvent, said graft copolymer having an ethylene-propylene-ethylidene norbornene spine to which butadiene and styrene have been grafted, said spine comprising 55 to 95% by weight of the graft copolymer.

---

This is a division of application Ser. No. 37,030, filed May 13, 1970, now Pat. No. 3,653,423.

This invention relates to a laminated polymeric article and a method of preparing the same.

More specifically, the instant invention teaches a method of laminating EPDM rubber to general purpose rubber and the article formed thereby. By this means ozone and weather resistant veneers may be adhered to tire sidewalls.

EPDM rubbers are unique in that they possess many of the properties of conventional general purpose elastomers such as emulsion copolymers of butadiene and styrene (SBR), natural rubber (NR), cis 1,4-polybutadiene and synthetic cis-1,4-polyisoprene, while at the same time being much less susceptible to hot air degradation, ozone degradation and weather checking than the conventional general purpose elastomers. This is believed to be the result of two factors—(a) lower degree of unsaturation in EPDM and (b) location of the unsaturation in short side chains rather than in the main polymer chain. The degree of unsaturation (percent of the carbon to carbon linkages that are double bonds) in EPDM amounts to only a few percent (2–5) as compared to 30–32 in the conventional rubbers. This disparity in degree of saturation results generally in differences in rate of vulcanization. Therefore, the cured adhesion of a 100 percent EPDM compound to conventional rubber compounds is generally less than useful.

There are many applications of elastomers in which ozone resistance and resistance to weather checking are needed. Tire sidewalls, tire sidewall cover strips and garden hose covers are examples of such applications.

In accordance with the instant invention, it has been discovered that EPDM rubbers can be firmly adhered to conventional rubber compounds by selecting the appropriate EPDM rubber and coating the rubber surface with a cement as hereinafter described.

In order to obtain suitable adhesion, the EPDM rubber must be of the ethylidene norbornene type.

The preparation of such EPDM's is described in U.S. Pat. 3,151,173 and Belgian Pat. 697,049. Enough of the diene monomer units should be combined to cause the terpolymer to have an iodine number of at least 5 and in typical preferred polymers the value is 7 to 15. Higher amounts are also satisfactory, but they become uneconomical to produce. The weight percent of ethylene monomer units may be in the range of 40 to 80%, but in the typical preferred polymers, the range is 55 to 70%. Other commercially available EPDM rubbers, such as the 1,4-hexadiene or dicyclopentadiene type, cannot be used, except in minor amounts when blended with the aforesaid ethylidene norbornene type.

The cement used contains a graft copolymer having an ethylene/propylene/ethylidene norbornene rubber spine to which styrene and butadiene have been grafted.

To form the laminate, the two unvulcanized rubber surfaces to be joined are first coated with a thin layer of cement (e.g., 1 to 3 mils), the solvent allowed to evaporate, and then the plied assembly is cured under pressure.

The general purpose rubber compound may be an emulsion copolymer of butadiene and styrene, and alfin copolymer of butadiene and styrene, and blends of these with one another or with cis-polybutadiene. The polybutadiene or butadiene-styrene copolymers should have a total cis content of not more than 65% of the total cis, trans, and vinyl contents. The negative effect of cis-polybutadiene is completely unexpected and is not understood.

The ethylene/propylene/ethylidene norbornene (E/P/ENB) spine used in the graft polymerization is conventionally prepared in solution in an organic solvent. This solution, or a solution made by dissolving the solid E/P/ENB rubber spine in an organic solvent for this purpose, must first be converted into a latex if the grafting reaction is to be carried out by an emulsion process. Any suitable conventional method for converting the rubber solution (cement) into an aqueous dispersion may be used, such as that described in British Pat. No. 893,066. Preparation of latex from the cement typically involves emulsifying the cement in water and stripping off the solvent. The resulting dispersion may be concentrated and creamed by conventional procedures to produce a latex having a convenient solids content.

In the preparation of the graft copolymer by emulsion polymerization the butadiene and styrene monomers and an appropriate free radical source are added to a latex of the E/P/ENB rubber. The dispersion is then heated in order to polymerize the monomers and the grafted copolymer isolated in the usual manner by coagulation. Graft copolymers having from 2 to 45 wt. percent of SBR, based on total weight of SBR and E/P/ENB, are effective in adhering E/P/ENB rubber and blends of E/P/ENB, and EPDM rubbers to polydiene rubbers.

The adhesive cement is prepared by first forming a compounded graft copolymer stock. Compounding and vulcanizing ingredients are so chosen and are used in such amounts as to effect vulcanization of the polybutadiene to a vulcanizate having good properties; the selection of these ingredients and the determination of the amounts used are in accordance with principles well known to those skilled in the art of compounding and vulcanizing polybutadiene and EPDM rubbers.

Usually the cement stock thus prepared contains conventional loadings of fillers such as reinforcing channel (MPC or EPC) or furnace (HAF, SAF, etc.) carbon blacks or white reinforcing filler such as fine particle size hydrated silica and silicon dioxide. It may also contain extender oils customarily used in rubber compounding such as the paraffinic, aromatic or naphthenic type in an amount up to 100 parts per 100 parts of polymer. The reinforcing filler should be adjusted to 20 to 30 volumes of filler per 100 volumes of rubber plus oil.

The compounded graft copolymer stock is dispersed in a suitable organic solvent in the usual manner whereby the polybutadiene stock and other materials in the polybutadiene stock are dissolved or dispersed in the solvent according to their solubilities. If desired, tackifying resins such as those disclosed in U.S. Pat. 3,408,253 may also be added. The cement is so formulated as to contain from 3 to 20 parts by weight of total solids per 100 parts of the cement. The preferred range is 6 to 10. (The volatile organic solvent used as the vehicle in the cement can be any liquid having the requisite power of dissolving the polybutadiene compound and having appropriate volatility. Examples are cyclohexane, gasoline, trichloroethylene, n-hexane.)

An important feature of the rubber and cement compositions of the invention is the use of vulcanization accelerators that are approximately equally effective for E/P/ENB rubber and general purpose polybutadiene rubbers.

The preferred accelerators for vulcanizing the composites and the cement composition may be described generically by the following formula:

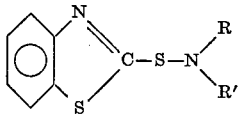

where R may be hydrogen or an alkyl radical having 1 to 20 carbon atoms; and R' may be an alkyl radical with 1 to 20 carbon atoms, a phenyl group; and R and R' may be a single aliphatic alpha, omega di-radical of 2 to 6 atoms, one or more of which may be a heteroatoms selected from the group consisting of oxygen, sulfur or nitrogen. Examples of the preferred accelerators include N-cyclohexylbenzothiazole-2-sulfenamide, 2-[(N-morpholino)thio]benzothiazole, and N,N - ditert-butylbenzothiazole-2-sulfenamide.

TESTING TECHNIQUE

For the purpose of determining good cured adhesion, adhesion test slabs are tested on the dynamic adhesion test using the apparatus described by F. H. D. Arkerman in the Journal of Applied Polymer Science, vol. 7, page 1425 (1963) without the photographic equipment. To prepare the sample, two slabs of the vulcanizable rubber stocks to be adhered together, measuring about 4 x 4 inches in area and from 0.1 to 0.2 inch in thickness, are cut from calendered sheets and one superimposed on the other, a very thin sheet of plastic film such as Mylar polyester, being inserted between them over about one-half of their area. The directly contacting faces of the rubber pieces are first coated with the bonding cement. Pieces of nylon or rayon fabric are then laid against the top and bottom outer faces of the slabs. The composite is placed in a platen mold and vulcanized under heat and pressure. The vulcanized composite is then cut into strips 1 x 4 inches in such direction that half of each strip contains the plastic release sheet. The ends of the strip can then be pulled apart so that the sample has two legs joined to a unitary body of rubber, half the length of the sample, in which the two rubber stocks have become integrally united. The legs of the sample are clamped into the two sample-holding jaws of the machine at a constant predetermined distance from the line of partition between the two legs of the sample. The clamped sample is then pre-heated 15 minutes at the temperature of the test. The sample holder is then mounted in the oven of the machine maintained at the desired temperature, balanced inertia weights are applied, and the cam-operated oscillation is started, as described by Akkerman. A dial-type thickness gauge is mounted on the machine in such a manner as to permit a direct measurement of changes in the distance between the upper and lower sample jaws. The change in position of the lower jaw affords a measure of the resistance of the adhering rubber stocks to a separating pull. The test is run for 15 minutes at an oven temperature of 120° C., or until the sample completely separates and the time and extent of separation are recorded. The data are here reported as reciprocals of the rate of separation or specifically, the time in minutes to achieve an inch of separation calculated from the rate derived from the test. This method of treating the data has the advantage of showing the results as whole numbers increasing in magnitude as the degree of adhesion increases. For example, if a sample separated 0.25 inch in 15 minutes, the result would appear as 60 minutes/inch as reported here. Values equal to or greater than 30 minutes/inch indicate a level of adhesion which would be satisfactory for many rubber products including tires.

PREPARATION OF RUBBER STOCK

All the rubber compounds used in the experiments reported herein were made according to the following recipe:

TABLE I

| | Parts by weight |
|---|---|
| Polymer | 100 |
| Aromatic extender oil, ASTM Type 102 | 40 |
| Carbon black, ASTM N–285 | 70 |
| N-isopropyl-N'-phenyl-p-phenylene diamine | 1 |
| Stearic acid | 1 |
| Zinc oxide | 5 |
| N-cyclohexylbenzothiazole-2-sulfenamide | 1 |
| Diphenyl guanidine | 0.3 |
| Sulfur | 2 |

The same recipe was used for the preparation of E/P/ENB rubber compounds used in adhesion test pads, the compounds used in making the cements and in the general purpose rubber compounds used in adhesion test pads.

The rubber compounds were prepared in the customary manner using a Banbury mixer to combine all of the ingredients except the last three which were added on a 2-roll rubber mill. The Banbury was heated with steam to attain a stock temperature of 150° C. at the time it was dumped, which was usually about ten minutes at 55 r.p.m. in the laboratory "B" Banbury. The sulfur and accelerators were added on a 2-roll rubber mill at 125–150° F.

A test slab, 6 x 6 x 100 inches was vulcanized for 30 minutes at 160° C. and tested at 25° C. for its stress-strain properties. A load at 300% extension in the range of 700 to 1500 pounds per square inch was accepted as evidence that no serious error had been made in compounding and also as evidence that a satisfactory state of cure would be attained in the adhesion test slabs. This cure specification is met by EPDM rubbers which contain ethylidene norbornene but not by EPDM containing only 1,4-hexadiene or dicyclopentadiene as the termonomer for unsaturation. The last two are not sufficiently responsive to sulfenamide acceleration.

Sheets of the uncured compound having a thickness of 0.175 inch were prepared by passing the compound through a roll calender. These sheets were used in the construction of test slabs to determine the effectiveness of the various bonding cements.

PREPARATION OF GREATER POLYMER

Two E/P/ENB latices were used to prepare the SRB to E/P/ENB graft copolymers described in this application. The first E/P/ENB/ latex–1, was prepared in the following manner. One hundred parts of a 7.38% solution of the E/P/ENB polymer (percent ethylene=60, iodine No=10, and ML-4 at 212° F.=90) in commercial n-hexane and one hundred parts of aqueous soap solution containing 0.83% Sipex SB (sodium salt of lauryl sulfate, Alcolac Chemical Corp.) and 0.017% aqueous hydroxide were pumped by means of positive displacement pumps through an in-line pre-mixer into a Manton-Gaulin Model 4D colloid mill at two pounds per minute. The emulsion, thus formed, was recirculated 3 times through the colloid mill to assure uniformity.

In batch operation, one hundred pounds of this emulsion were then charged to a 20 gallon evaporator where the solvent was removed from the emulsion by heating with stirring. During the last stage of evaporation, the evaporator was evacuated to assure removal of all the solvent. This dilute latex was then concentrated to a solids content of 54.4% in a disk centrifuge.

The second latex, E/P/ENB latex-2, was prepared in the following manner. One hundred parts of a 7.6% solution of the same E/P/ENB polymer in commercial n-hexane and one hundred parts of aqueous soap solutions containing 0.78% lauric acid and 0.30% aqueous potassium hydroxide were pumped by means of positive displacement pumps through an in-line premixer into a Manton-Gaulin Model 4D colloid mill at two pounds per minute. The emulsion, thus formed, was recirculated 3 times through the colloid mill to assure uniformity. The latex was then stripped of solvent and concentrated in the manner described for E/P/ENB latex-1. The solids content was 50.0%.

Thereafter, the E/P/ENB latex, distilled water, free radical initiator, and styrene was charged into a glass bottle. After purging with nitrogen, the bottle was sealed using a cap containing a self-sealing liner. Liquid butadiene under pressure was added to the bottle through a hole in the cap and the bottle placed in a 50° C. agitated water bath in order to polymerize the butadiene and styrene monomers. After removing the bottle from the water bath, the percent conversion of butadiene and styrene monomers to polymer was determined by measuring the solids content of the emulsion (drying a portion of the sample on a hot plate). After adding a combination of antioxidants [tri(nonylated phenyl phosphite [1], alkylated bisphenol [2], and dilauryl thiodipropionate], the graft copolymer was recovered by flocculation with salt, washed, and dried in an air oven at 50° C. The recipes for the preparation of the SBR to E/P/ENB graft copolymers used in the examples of this application are given in the following table:

In order to illustrate the invention, the following examples are set forth:

In Examples 1 through 13 a series of adhesion pads were made to test the bonding qualities of cements based on various elastomeric compositions. In each case EPDM (A or B) was used in one layer of the adhesion pad and Synpol 1712 (trademark) in the other. (Synpol 1712 is a synthetic rubber of butadiene and styrene made by Texas-U.S. Chemical Company containing 23± 1% styrene, 37.5 phr. aromatic extender oil, and having a Mooney viscosity at 212° F. of 43–55.) EPDM-A was used in Examples 1, 3, 9, 10 and 12 while EPDM-B was used in Examples 2 and 4, 5, 6, 7, 8, 11, and 13.

In Examples 1 through 7 the cements were based on SBR to E/P/ENB graft copolymers, while in Example 8 the cement was based on an E/P/ENB polymer that had been heated in the presence of Vazo, and was identical to that used in Example 5 except for the absence of SBR. The results 1 through 8 are tabulated below:

| Example | Graft copolymer used in cement | SBR to E/P/ENB ratio | Dynamic adhesion M250° F., min./inch |
| --- | --- | --- | --- |
| 1 | A | 50/50 | 0 |
| 2 | B | 41/59 | 92 |
| 3 | C | 37/63 | 62 |
| 4 | D | 30/70 | 48 |
| 5 | E | 18/82 | 58 |
| 6 | F | 7/93 | 52 |
| 7 | G | 4/96 | 57 |
| 8 | H | 0/100 | 0 |

TABLE II.—PREPARATION OF GRAFT COPOLYMERS

| | A | B | C | D | E | F | G | H | I |
| --- | --- | --- | --- | --- | --- | --- | --- | --- | --- |
| E/P/ENB Latex-1 (54.4% solids) | 73.5 | | 73.5 | | | | | | 73.5 |
| E/P/ENB Latex-2 (50.0% solids) | | 80 | | 110 | 140 | 80 | 170 | 140 | |
| Distilled water | 266 | 260 | 266 | 245 | 230 | 260 | 215 | 230 | 266 |
| Lupersol 11 [1] | | | 1.5 | | | 1.5 | | | 1.5 |
| Vazo [2] | 1 | 1 | | .75 | .5 | | .25 | .5 | |
| Styrene | 18 | 18 | 18 | 13.5 | 9 | 18 | 4.5 | | 18 |
| Butadiene | 42 | 42 | 42 | 31.5 | 21 | 42 | 10.5 | | 42 |
| Reaction temp., °C | 50 | 50 | 50 | 50 | 50 | 50 | 50 | 50 | 50 |
| Reaction time, hrs | 116 | 74 | 126 | 74 | 74 | 74 | 74 | 74 | 116 |
| Percent conversion | 68 | 47 | 38 | 51 | 53 | 5 | 26 | | 35 |
| Antioxidants added: | | | | | | | | | |
| Naugawhite | .06 | .14 | .06 | .16 | .18 | .09 | .18 | .14 | .06 |
| Polygard | .38 | .83 | .38 | .95 | 1.06 | .52 | 1.09 | .86 | .38 |
| Dilauryl thiodipropionate | .18 | .39 | .18 | .44 | .49 | .24 | .51 | .40 | .18 |
| SBR to E/P/ENB ratio | 50/50 | 41/59 | 37/63 | 30/70 | 18/82 | 7/93 | 4/96 | 0/100 | 34/66 |

[1] Free radical initiator—t-butyl peroxypivalate (Lucidol Division, Wallace and Tiernan, Inc.).
[2] Free radical initiator—azobisisobutyronitrile (E. I. du Pont de Nemours & Co.).

PREPARATION OF CEMENT

Cements were made by dispersing the raw compound, made according to the above recipe, in cyclohexane. The proportions used were 6 grams of cement compound and 100 ml. cyclohexane. The procedure used in making cement was to take freshly milled stock, cut it into small pieces which were placed in the solvent and shaken vigorously overnight. Then the mixture was homogenized by use of a high speed Eppenbach Homo-mixer.

EPDM

Two different E/P/ENB elastomers were used in the following experiments. Their characteristics are tabulated below:

| EPDM | Weight percent ethylene | Iodine No. | ML-4, 212° F. |
| --- | --- | --- | --- |
| A | 62 | 7 | 91 |
| B | 60 | 10 | 90 |

PREPARATION OF LAMINATE

The bonding cements were painted on the two slabs of vulcanizable rubber stocks, one containing E/P/ENB and the other containing a general purpose rubber such as SBR. After waiting 30 minutes for most of the solvent to evaporate, the two pieces were put together and vulcanized for 30 minutes at 320° F. The quality of adhesion was determined by use of the dynamic test described.

[1] Polygard, TM of Uniroyal, Inc.
[2] Naugawhite, TM of Uniroyal, Inc.

Poor adhesion was obtained in Examples 1 and 8 where the graft copolymers contained 50% and 0% SBR respectively. However, excellent adhesion was obtained in Examples 2 through 7 where the graft copolymers contained from 4 to 41% SBR.

In Example 9 the cement contained no polymer, while in Examples 10 and 11 the cement was based on SBR (Synpol 1712) and EPDM-B respectively. The polymer cements used in Examples 12 and 13 were based on physical blends of SBR (Synpol 1712) and EPDM-B and contained 50 and 57% SBR respectively. The results on Examples 9 through 13 are tabulated below.

| Example | Polymer used in cement | Dynamic adhesion at 250° F., min./inch |
| --- | --- | --- |
| 9 | None | 0 |
| 10 | SBR | 7 |
| 11 | E/P/ENB | 0 |
| 12 | 50% EPDM/50% SBR | 0 |
| 13 | 63% EPDM/37% SBR | 0 |

Poor adhesion was obtained in Examples 9 through 13. Thus, neither SBR nor E/P/ENB alone nor blends of these polymers are effective in adhering SBR to E/P/ENB. Satisfactory adhesion is obtained only when the polymer in the cement is prepared by polymerizing SBR in the presence of E/P/ENB and only when the graft copolymer thus formed contains from approximately 2% SBR to approximately 46% SBR.

In Examples 14 through 18 a cement based on SBR to E/P/ENB graft copolymer I containing 34% SBR was used to adhere EPDM-B to blends of two polybutadiene elastomers (polybutadiene A [1] containing 96% cis, 1% trans, and 3% vinyl and polybutadiene B [2] containing 15% cis, 68% trans, and 17% vinyl). In each case EPDM-B was used in one layer of the adhesion pad and a blend of polybutadienes A and B in the other. The results on Examples 14 through 18 are tabulated below.

| Example | Ratio of polybutadiene A to polybutadiene B | Percent cis in A/B blend | Dynamic at 250° F., adhesion min./inch |
|---|---|---|---|
| 14 | 0/100 | 15 | 71 |
| 15 | 25/75 | 35.2 | 79 |
| 16 | 50/50 | 55.5 | 62 |
| 17 | 75/25 | 75.8 | 0 |
| 18 | 100/0 | 96 | 0 |

These examples indicate that SBR to E/P/ENB graft copolymers are useful in adhering E/P/ENB to polybutadiene in cases where the cis content of the polybutadiene or polybutadiene blend is less than approximately 65%.

In examples 19 through 29 blends of different EPDM rubbers are adhered to SBR rubber stocks and blends of two polybutadiene rubbers containing widely different amounts of "cis" unsaturation. The cement polymers also contain different SBR to E/P/ENB ratios. The results are set forth below.

98% of the total graft copolymer, said compounded graft copolymer being dispersed in a volatile organic solvent.

2. The cement of claim 1 wherein the compounded graft copolymer contains a sulfur vulcanizing accelerator which is equally effective for ethylene-propylene-ethylidene norbornene rubber and for general purpose polybutadiene rubbers.

3. The cement of claim 1 wherein said volatile organic solvent is cyclohexane.

4. The cement of claim 1 wherein the weight ratio of butadiene to styrene is from about 2.0 to about 2.5.

5. The cement of claim 1 wherein the compounded graft copolymer contains a sulfene-amide-type accelerator having the formula:

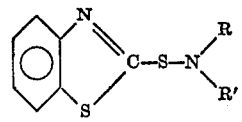

wherein R is hydrogen or an alkyl group having from 1 to 20 carbon atoms; R' is an alkyl group having from 1 to 20 carbon atoms or a phenyl group; or R and R' jointly are a single aliphatic alpha, omega diradical having 2 to 6 atoms.

6. The cement of claim 5 wherein the sulfene-amide-type accelerator is selected from the group consisting of N-cyclohexylbenzothiazole-2-sulfenamide, 2-[(N-morpholino)thio]-benzothiazole, and N,N-ditert-butylbenzothiazole-2-sulfenamide.

| Example | Diene in EPDM rubbers | EPDM/ E/P/ENB weight ratio in EPDM blends | SBR to E/P/ENB ratio in cement graft copolymer | Laminate rubber | PbteA/ PbteB | Dynamic adhesion at 250° F., min./inch |
|---|---|---|---|---|---|---|
| 19 | Dicyclopentadiene [1] | 20/80 | 41/59 | SBR | | 57 |
| 20 | do.[1] | 50/50 | 41/59 | | 0/100 | 41 |
| 21 | do.[1] | 70/30 | 41/59 | SBR | | 0 |
| 22 | do.[1] | 60/40 | 37/63 | | 25/75 | 42 |
| 23 | 1,4 hexadiene [2] | 50/50 | 37/63 | SBR | | 48 |
| 24 | do.[2] | 60/40 | 37/63 | | 50/50 | 38 |
| 25 | do.[2] | 20/80 | 30/70 | | 0/100 | 53 |
| 26 | Methyl tetrahydroindene [3] | 65/35 | 30/70 | SBR | | 0 |
| 27 | do.[3] | 70/30 | 7/93 | | 25/75 | 0 |
| 28 | do.[3] | 60/40 | 7/93 | SBR | | 40 |
| 29 | do.[3] | 20/80 | 18/82 | | 75/25 | 0 |

[1] Uniroyal Chemical "Royalene 302," an EPDM rubber containing 35 weight percent propylene, an iodine number of 13 and a Mooney viscosity (ML-4 at 212° F.) of 90.
[2] Du Pont "Nordel 1470" an EPDM rubber containing 43 weight percent propylene, an iodine number of 20 and a Mooney viscosity (ML-4 at 212° F.) of 85.
[3] Montecatini "Dutral S4090X2", an EPDM rubber containing 38 weight percent propylene, an iodine number of 19 and a Mooney viscosity (ML-4 at 212° F.) of 92.

These examples show how SBR to E/P/ENB graft copolymers can be used to adhere blends of EPDM—E/P/ENB blends to either SBR or blends of polybutadiene wherein the cis content of the polybutadiene blend is less than approximately 65% and wherein the E/P/ENB content of the EPDM blend is at least 40%

[1] "Takene 1220"—Polymer Corporation, Sarnia, Canada.
[2] "Diene-45"—Firestone Tire and Rubber Company.

Having thus described my invention, what I claim and desire to protect by Letters Patent is:

1. A bonding cement which comprises: a compounded graft copolymer having an ethylene-propylene-ethylidene norbornene spine to which styrene and butadiene have been grafted, the percent by weight of the ethylene-propylene-ethylidene norbornene polymer being from 55 to

References Cited

UNITED STATES PATENTS

| | | | |
|---|---|---|---|
| 3,538,192 | 11/1970 | Bishop | 260—878 R |
| 3,475,514 | 10/1969 | Nemphos et al. | 260—878 R |
| 3,492,370 | 1/1970 | Wirth | 161—253 X |
| 3,532,592 | 10/1970 | Kraus et al. | 161—253 X |

GEORGE F. LESMES, Primary Examiner

L. T. KENDELL, Assistant Examiner

U.S. Cl. X.R.

156—334; 161—253; 260—878 R